(No Model.)
E. BARRATH.
POWER PRESS.
No. 316,935. Patented May 5, 1885.
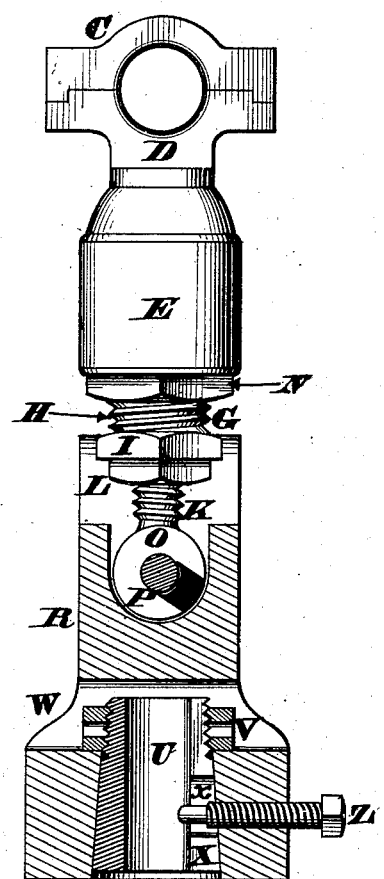
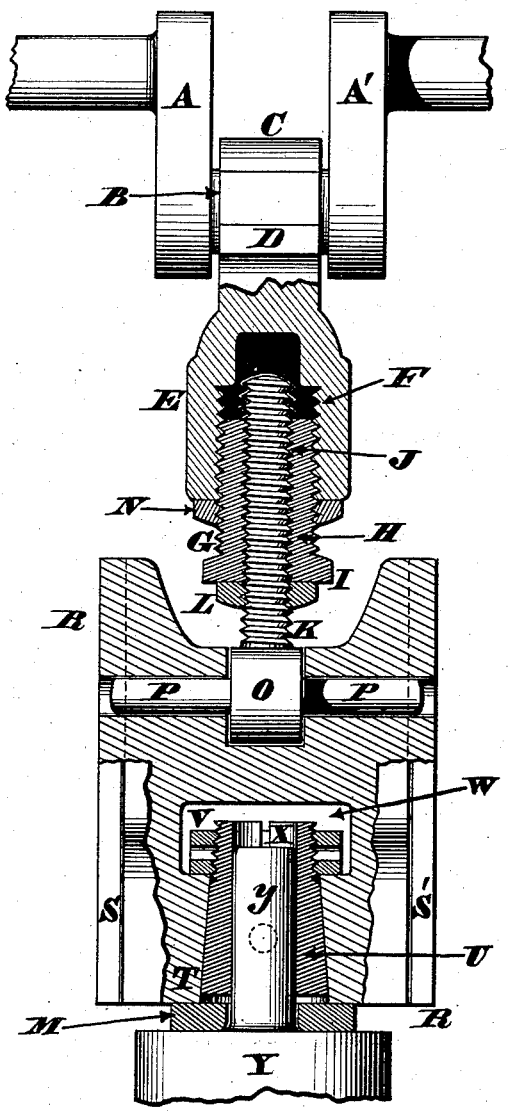
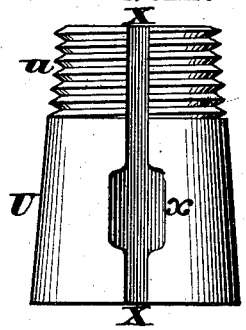
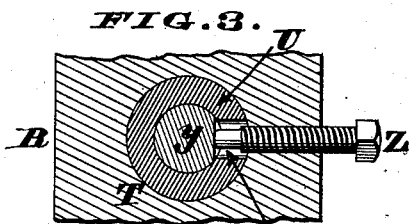
Attest.
William Haller.
William Stemmler.
Inventor.
Edward Barrath
by James H. Layman
Atty.

UNITED STATES PATENT OFFICE.

EDWARD BARRATH, OF BROOKLYN, NEW YORK.

POWER-PRESS.

SPECIFICATION forming part of Letters Patent No. 316,935, dated May 5, 1885.

Application filed March 28, 1884. (No model.)

*To all whom it may concern:*

Be it known that I, EDWARD BARRATH, a subject of the King of Sweden, residing at Brooklyn, in the county of Kings and State of New York, have invented certain new and useful Improvements in Power-Presses, of which the following is a specification, reference being had therein to the accompanying drawings.

This invention relates to those power-presses which are employed for stamping, punching, drawing, and similar purposes; and the first part of my improvements comprises a novel combination of devices wherewith the slide or cross-head that carries the punch may be adjusted either toward or away from the wrist or crank pin that operates said slide. To accomplish this result, I couple the slide to a male screw that engages with the female screw of a tubular nut, which latter has an external thread that engages with the internal thread of a suitable head, this head being either integral with or securely attached to the lower member of the box or other joint that takes hold of the driving-wrist or crank-pin. By this arrangement the proper turning of the tubular nut will compel the slide to advance toward or recede from the wrist or crank-pin, while a pair of jam-nuts serves to retain said slide at any desired adjustment, as hereinafter more fully described.

The second part of my improvements consists in making a conical socket, bore, or chamber in the lower end of the slide, into which socket is fitted a longitudinally-split thimble or bushing, whose upper or smaller end is screw-threaded to receive a nut, which latter, when properly turned, will cause said thimble to advance within said socket, and thereby grasp the stem of the punch in the most secure manner, as hereinafter more fully described.

In the annexed drawings, Figure 1 shows the adjusting devices in elevation, the connected slide and its accessories being sectioned transversely of the coupling-pin. Fig. 2 is a vertical section taken in the plane of said coupling-pin. Fig. 3 is a horizontal section of the slide, taken in the plane of the set-screw Z. Fig. 4 is an enlarged elevation of the conical bushing or thimble detached from said slide.

Referring to Fig. 2, A A' represent a pair of cranks or plates to which the wrist or pin B is attached, said wrist or pin having coupled to it the upper and lower bearings, C D, of a box or strap joint or other connection. The lower member or bearing, D, has a head, E, within which is chased a female thread, F, said thread having engaged with it a male thread, G, of a long or tubular nut, H, that terminates with a head or square, I, to facilitate its proper manipulation. Furthermore, this tubular nut H is threaded internally at J to admit the screw K, which must be pitched reversely with reference to the other screw, G.

L is a jam-nut that retains the inner screw, K, at any desired adjustment. N is a similar nut for the outer screw, G.

Screw K is either made integral with a knuckle, O, or is securely attached thereto, a pin or pivot, P, being employed for coupling said knuckle to an ordinary reciprocating slide or cross-head, R, having tongues S S', that confine it to a proper path in the main frame of the press. The lower end of this slide has a conical socket, bore, or chamber, T, to admit a tapering bushing or thimble, U, having at its upper end a screw, $u$, wherewith is engaged a capstan-nut, V, that bears against the bottom of a mortise, W, made transversely through said slide, as seen in Fig. 1. Furthermore, the tapering thimble U is split from end to end, as shown at X X in Fig. 4, so as to allow said thimble to be firmly compressed around the stem $y$ of an ordinary punch, Y, as represented in Figs. 2 and 3. This split is widened at $x$ to avoid contact with the set-screw Z, that is tapped in the slide R, and is adapted to bear against a flat face of the punch-stem, so as to prevent any turning of the latter.

M is a ring or washer interposed between the head of a punch and the lower end of the slide or cross-head R. To adjust this slide either toward or away from the wrist B, as occasion may require, it is necessary only to loosen the jam-nuts L N, and then grasp the square or head $g$ of the tubular nut H and turn the latter either to the right or left. After the desired adjustment has been thus effected the jam-nuts L N are then run home, so as to lock the screws H K immovably in position. Consequently the slide R will be maintained in this position with reference to the wrist B until it is again necessary to shift said slide for some other purpose.

In applying the punch Y to the press the stem $y$ is inserted in the thimble U, and the nut V of the latter is turned so as to cause said thimble to advance within the conical bore or chamber T. By this act the thimble is compressed around the stem in the most secure manner, thereby preventing the punch dropping out, no matter how severe may be the duty imposed on the press. As this compression of the thimble is effected by drawing it up within the chamber T, it is evident some provision must be made for allowing said thimble to clear the point of the screw Z while the former is being either advanced or retracted. This result is accomplished by enlarging the slit X at $x$, the length of which enlargement should be equal to any possible travel of the thimble.

When in operation, the washer or ring M prevents the punch Y coming in contact with the lower end of the thimble, which expedient will be especially useful when the diameter of said punch is less than that of the bore T.

It is evident the above-described improvements combine great strength with simplicity, neatness, and durability of construction, while all the adjustments are easily and quickly performed. Finally, each press may be furnished with a set of bushings of different diameters, so as to take in any kind of punch that may be used with such appliances.

I claim as my invention—

1. The combination, in a power-press, of slide R, coupling O P, screw K, tubular nut G H J, jam-nuts L N, and internally-threaded head E F, which latter connects with the wrist B, substantially as herein described.

2. The combination, in a power-press, with the slide R, provided with the transverse mortise W and conical opening T, of the longitudinally-split thimble U $u$ X and nut V, for the purpose described.

3. In combination with the slide R, having a conical opening, T, nut V, and set-screw Z, the thimble U $u$, whose longitudinal slit X is enlarged at $x$ to clear said screw, in the manner herein described.

In testimony whereof I affix my signature in presence of two witnesses.

EDWARD BARRATH.

Witnesses:
JAMES H. LAYMAN,
SAML. S. CARPENTER.